(12) United States Patent
Sachs et al.

(10) Patent No.: US 9,678,909 B1
(45) Date of Patent: Jun. 13, 2017

(54) METHODS AND SYSTEMS OF EXCHANGING DATA BETWEEN AN ELECTRONIC DEVICE AND AN EXTERNAL ACCESSORY

(71) Applicant: MOTOROLA SOLUTIONS, INC., Schaumburg, IL (US)

(72) Inventors: Daniel Grobe Sachs, Elmhurst, IL (US); Charles B. Harmke, Huntley, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/159,528

(22) Filed: May 19, 2016

(51) Int. Cl.
| | |
|---|---|
| G06F 13/10 | (2006.01) |
| G06F 13/38 | (2006.01) |
| G06F 13/40 | (2006.01) |
| G06F 13/24 | (2006.01) |
| G06F 1/32 | (2006.01) |
| G06F 11/30 | (2006.01) |
| H04W 4/10 | (2009.01) |

(52) U.S. Cl.
CPC .......... *G06F 13/385* (2013.01); *G06F 1/3287* (2013.01); *G06F 1/3296* (2013.01); *G06F 11/3051* (2013.01); *G06F 13/24* (2013.01); *G06F 13/4022* (2013.01)

(58) Field of Classification Search
CPC ............. H04W 4/10; H04B 1/38; G06F 13/10
USPC ...................... 710/106, 14, 20; 455/90.2, 557
See application file for complete search history.

(56) References Cited

U.S. PATENT DOCUMENTS

| | | | | |
|---|---|---|---|---|
| 4,827,520 | A | * 5/1989 | Zeinstra | .............. B60R 16/0373 701/1 |
| 5,649,307 | A | * 7/1997 | Patino | ...................... H04B 1/38 379/390.01 |
| 5,881,370 | A | * 3/1999 | Pottala | ..................... H04B 1/44 370/296 |
| 7,424,312 | B2 | 9/2008 | Pinder et al. | |
| 7,836,216 | B2 | 11/2010 | Kashi et al. | |
| 8,290,573 | B2 | 10/2012 | Paine et al. | |
| 8,467,540 | B2 | 6/2013 | Lu | |
| 8,718,722 | B2 | 5/2014 | Fukunaga | |
| 8,909,173 | B2 | * 12/2014 | Harmke | ....................... 455/3.06 |
| 9,042,845 | B2 | * 5/2015 | Torstensson | .................. 381/111 |
| 9,210,555 | B2 | 12/2015 | Larson et al. | |

(Continued)

FOREIGN PATENT DOCUMENTS

WO 2013116741 8/2013

*Primary Examiner* — Christopher Shin
(74) *Attorney, Agent, or Firm* — Michael Best & Friedrich LLP

(57) ABSTRACT

A method of exchanging data between an electronic device and an external accessory. In one example, the method includes receiving, at an interface of the electronic device, a connector of the external accessory. The method also includes transmitting, via a first pin of the interface, data between the external accessory and the electronic device, and interrupting, with an electronic processor of the electronic device, data transmission between the external accessory and the electronic device via the first pin of the interface. The method further includes while data transmission is interrupted, detecting, via the first pin of the interface, an activation of a talk actuator, and activating, via the electronic processor, a transmitter in response to detecting the activation of the talk actuator.

22 Claims, 9 Drawing Sheets

(56) References Cited

U.S. PATENT DOCUMENTS

| | | | |
|---|---|---|---|
| 2008/0207264 A1* | 8/2008 | Harmke | H04M 1/6008 |
| | | | 455/557 |
| 2014/0004807 A1* | 1/2014 | Harmke | H04M 1/72547 |
| | | | 455/90.2 |
| 2015/0244406 A1* | 8/2015 | Abdullah | H04B 1/385 |
| | | | 455/90.2 |
| 2016/0088448 A1* | 3/2016 | Han | H04W 4/008 |
| | | | 455/90.2 |

* cited by examiner

METHODS AND SYSTEMS OF EXCHANGING DATA BETWEEN AN ELECTRONIC DEVICE AND AN EXTERNAL ACCESSORY

BACKGROUND OF THE INVENTION

Electronic devices, for example, portable communication devices, may be connected to external accessories. Typically, external accessories enhance or provide additional functionality of or to an electronic device. In some case the data exchanged between the external accessory and the electronic device requires several communication and/or power lines. Consumers, however, sometimes prefer smaller and/or standard interfaces to connect the external accessories to the electronic device. Reducing the number of communication lines between the electronic device and the external accessories, and standardizing these connections, while also providing useful additional functionality through the external accessory can be challenging.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
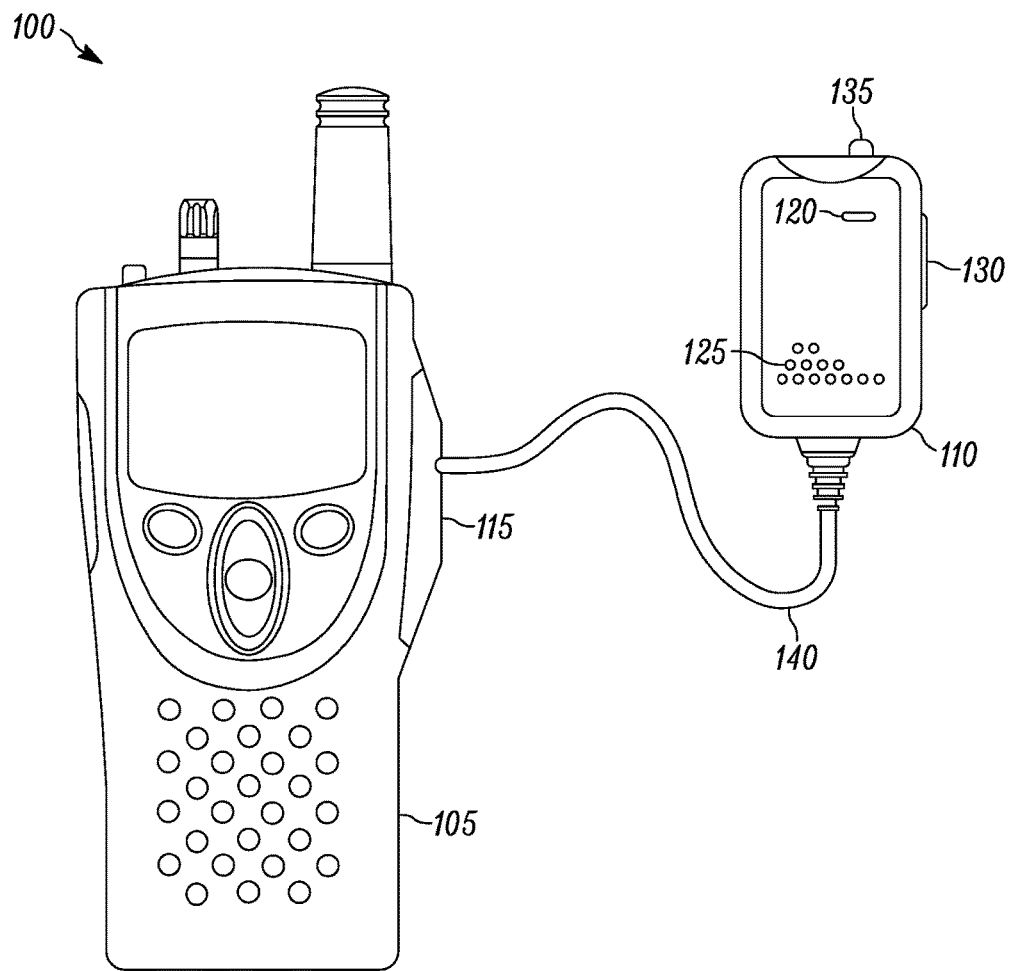
FIG. 1 is a front view of a communication system according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method of exchanging data between an electronic device and an external accessory. The method includes receiving, at an interface of the electronic device, a connector of the external accessory. The method also includes transmitting, via a first pin of the interface (for example, a multimode pin), data between the external accessory and the electronic device, and interrupting, with an electronic processor of the electronic device, data transmission between the external accessory and the electronic device via the first pin of the interface. The method further includes while data transmission is interrupted, detecting, via the first pin of the interface, an activation of a talk actuator, and activating, via the electronic processor, a transmitter in response to detecting the activation of the talk actuator.

Another exemplary embodiment provides an electronic device. The electronic device includes an interface configured to receive a connector from an external accessory, and a transmitter configured to transmit messages to an external device. The interface including a first pin coupled to the connector. The electronic device also includes an electronic processor coupled to the interface and the transmitter. The electronic processor is configured to transmit, via the first pin of the interface, data between the external accessory and the electronic device, and interrupt data transmission between the external accessory and the electronic device through the first pin of the interface. The electronic processor is also configured to detect, while data transmission is interrupted, activation of a talk actuator via the first pin of the interface, and send an activation signal to the transmitter in response to detecting activation of the talk actuator.

FIG. 1 is a front view of a communication system 100 according to some embodiments. The communication system 100 includes an electronic device 105 and an external accessory 110. In the illustrated embodiment, the electronic device 105 includes a two-way radio. In other embodiments, however, the electronic device 105 may be, for example, a cellular telephone, a land mobile radio, and/or other electronic devices that connects to an external accessory 110. As shown in FIG. 1, the electronic device 105 connects to the external accessory 110 through a connector interface 115. In the example illustrated, the external accessory 110 includes a microphone 120, a speaker 125, and a talk actuator 130. The external accessory 110 also includes a secondary actuator 135. In one example, the secondary actuator 135 includes an emergency button. The external accessory 110 is coupled to the electronic device 105 via a cable 140 and a connector 145. The electronic device 105 may connect to different types of external accessories 110 that include the connector 145 (for example, that include a connector compatible with the connector interface of the electronic device 105).

Figure 2:
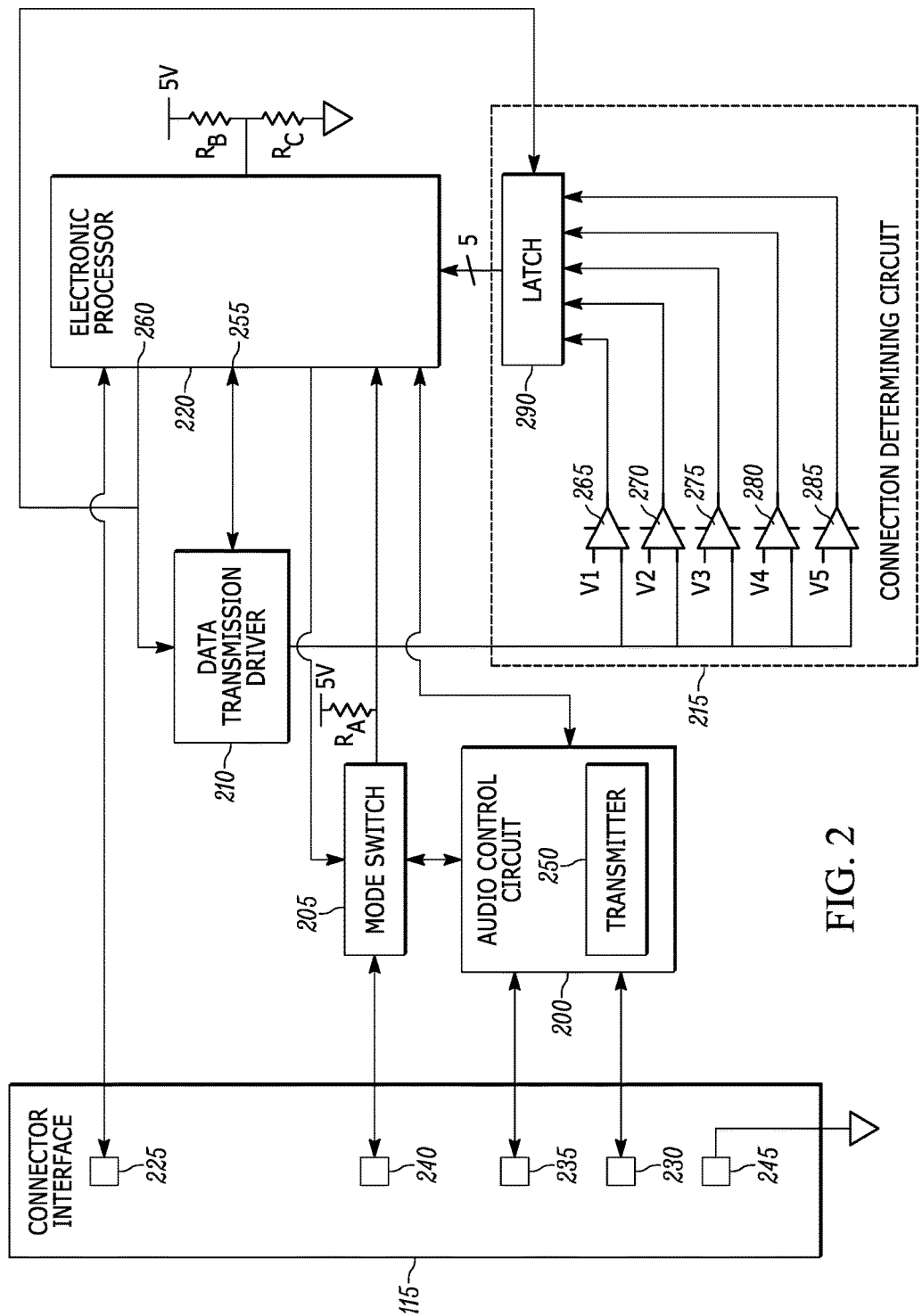
FIG. 2 is a diagram of an electronic device of the communication system of FIG. 1.

FIG. 2 is a diagram of the electronic device 105. As shown in FIG. 2, the electronic device 105 includes the connector interface 115, an audio control circuit 200, a mode switch 205, a data transmission driver 210, a connection determining circuit 215, and an electronic processor 220. The connector interface 115 receives the connector 145 from the external accessory 110 and enables communication between the electronic device 105 and the external accessory 110. The connector interface 115 includes a detect pin 225, a microphone pin 230, a speaker pin 235, a multimode pin 240, and a ground pin 245. The ground pin 245 is connected to ground and provides a reference voltage for the rest of the signals detected at the connector interface 115. The detect pin 225 is coupled to the electronic processor 220. The detect pin 225 sends a signal (for example, a second voltage) to the electronic processor 220 to indicate whether the connector 145 of the external accessory 110 is fully inserted into and connected with the connector interface 115.

The microphone pin 230 and the speaker pin 235 are coupled to the audio control circuit 200 to send and receive audio signals to and from the external accessory 110. The multimode pin 240 is coupled to the mode switch 205. In some portions of this application, the multimode pin 240 may be referred to as a first pint of the connector interface 115. The multimode pin 240 receives different signals (for example, different voltage levels) depending on the type and operation of the external accessory 110 coupled to the electronic device 105. Based on the signal received through the multimode pin 240, the electronic device 105 may detect the type of external accessory 110 coupled to the electronic device 105, exchange data with the external accessory 110, and detect activation of a talk actuator 130 and/or the secondary actuator 135 of the external accessory 110.

The audio control circuit 200 is coupled to the microphone pin 230, the speaker pin 235, and the electronic processor 220. The audio control circuit 200 is also selectively coupled to the multimode pin 240 based on the state of the mode switch 205. The audio control circuit receives sound signals from a microphone on the external accessory 110, and provides sound signals to the speaker and/or speakers of the external accessory 110. The audio control circuit 200 may include analog and/or digital components to process the sound data exchanged between the electronic device 105 and the external accessory 110 and/or to power the components of the audio control circuit 200. As shown in FIG. 2, the audio control circuit 200 includes (and controls) a transmitter 250 to transmit sound signals to an external device (for example, another electronic device 105 such as a two-way radio).

The mode switch 205 is coupled to the audio control circuit 200, the multimode pin 240, the connection determining circuit 215, and the data transmission driver 210. The mode switch 205 is switchable between a first state and a second state. When the mode switch 205 is in the first state, the electronic device 105 operates in a first mode. When the electronic device 105 operates in the first mode (the mode switch 205 is in the first state), the mode switch 205 couples the multimode pin 240 to the connection determining circuit 215 and to the data transmission driver 210. On the other hand, when the mode switch 205 is in the second state, the electronic device 105 operates in a second mode. When the electronic device 105 operates in the second mode, the mode switch 205 couples the multimode pin 240 to the audio control circuit 200 for the audio control circuit 200 to exchange sound signals with the external accessory 110. The mode switch 205 is also coupled to the electronic processor 220 to receive a control signal. The control signal commands the mode switch 205 to be in the first state or the second state, as determined by the electronic processor 220.

The data transmission driver 210 is coupled to the mode switch 205 and to the electronic processor 220. When the mode switch 205 is in the first state, the data transmission driver 210 exchanges data signals with the external accessory 110 via the multimode pin 240. The data transmission driver 210 processes these signals and determines whether configuration data and/or other type of data is to be transmitted to the electronic processor 220. The data transmission driver 210 is therefore coupled to the electronic processor 220 at a first input 255. The first input 255 couples the data transmission driver 210 with a data bus used to more efficiently transfer data signals received from the external accessory 110 to the electronic processor 220 for storage in a memory of the electronic processor 220 or coupled to the electronic processor 220.

The data transmission driver 210 is also coupled to the electronic processor 220 via an inhibit output 260. The data transmission driver 210 receives an interrupt signal from the electronic processor 220 through the inhibit output 260. When the data transmission driver 210 receives the interrupt signal from the electronic processor 220, the data transmission driver 210 interrupts (or suspends) the exchange of data signals via the multimode pin 240. In one example, the data transmission driver 210 includes a one-wire bus driver for half-duplex bidirectional communication. In other embodiments, however, different protocols may be used by the data transmission driver 210.

The connection determining circuit 215 is coupled to the mode switch 205 and to the electronic processor 220. As shown in FIG. 2, the connection determining circuit 215 includes a first comparator 265, a second comparator 270, a third comparator 275, a fourth comparator 280, a fifth comparator 285, and a latch 290. When the mode switch 205 is in the first state (the electronic device 105 is in the first mode), the connection determining circuit 215 receives the data signals from the multimode pin 240. The connection determining circuit 215 then uses the first comparator 265, second comparator 270, third comparator 275, fourth comparator 280, and fifth comparator 285 to determine whether the incoming data signal is within a first voltage range, a second voltage range, a third voltage range, or a fourth voltage range. Based on which voltage range corresponds to the voltage of the incoming signal from the multimode pin 240, the electronic processor 220 can determine the type of external accessory 110 coupled to the electronic device 105, and whether the talk actuator 130 and/or the secondary actuator 135 of the external accessory 110 is activated.

The first comparator 265, second comparator 270, third comparator 275, fourth comparator 280, and fifth comparator 285 are coupled to the latch 290. The latch 290 stores a previous value for each of the comparator outputs. More particularly, the latch 290 operates in a first latch state and a second latch state. In the first latch state, the outputs from the latch 290, which are sent to the electronic processor 220, change according to the outputs from the comparators of the connection determining circuit 215. When the latch 290 operates in the first latch state, the electronic processor 220 receives the changing outputs from the comparators of the connection determining circuit 215. In the second latch state, the outputs from that latch 290 do not change, but rather retain previous outputs from the comparators of the connection determining circuit 215. When the latch 290 operates in the second latch state, the electronic processor 220 receives previous outputs from the comparators of the connection determining circuit 215, but does not receive currently generated outputs from the comparators.

In one example, the first comparator 265 determines whether the voltage at the multimode pin 240 is less than or equal to approximately one Volt (V1 in FIG. 2). The second comparator 270 determines whether the voltage at the multimode pin 240 is greater than three Volts (V2 in FIG. 2). The third comparator 275 determines whether the voltage at the multimode pin 240 is greater than three point three (3.3) Volts (V3 in FIG. 2). The fourth comparator 280 determines whether the voltage at the multimode pin 240 is greater than three point six (3.6) Volts (V4 in FIG. 2). The fifth comparator 285 determines whether the voltage at the multimode pin 240 is greater than four point one (4.1) Volts (V5 in FIG. 2). These reference voltages (for example, V1, V2, V3, V4, and V5) allow the electronic processor 220 to specifically determine the type of accessory connected to the electronic device 105, and whether the talk actuator 130, and/or the secondary actuator 135 are activated. These reference voltages are designed according to the expected voltages when the talk actuator 130 and/or the secondary actuator 135 are activated and are based on resistors (for example, resistors R2, R3, R4, R5 shown in FIGS. 3B and 3C) coupled to the talk actuator 130 and the secondary actuator 135. Note that the activation of the talk actuator 130 and/or the secondary actuator 135 (or other actuators) do not reduce the voltage level on the data line (for example, the multimode pin 240) below a minimum input logic high voltage (for example, VIH) for the given data transmission protocol. Reducing the voltage at the multimode pin 240 below the minimum input logic high voltage may interfere with the data transmission over the multimode pin 240. Therefore, the reference voltages and the resistors (for example, resistors R2, R3, R4, R5 shown in FIGS. 3B and 3C) are designed specifically to maintain the voltage at the multimode pin 240 above the minimum input logic high voltage for the given data transmission protocol (for example, one-wire).

The latch 290 operates in the second latch state when the data transmission driver 210 exchanges data with the external accessory 110. When data transmission is in progress, the voltage values received by the first comparator 265, second comparator 270, third comparator 275, fourth comparator 280, and fifth comparator 285 are not indicative of the type of device and/or whether the talk actuator 130 and/or the secondary actuator 135 are activated. In other words, the outputs of the comparators during data transmission are invalid. Therefore, to prevent the electronic processor 220 from reacting to a change in the voltage level of the incoming signal from the multimode pin 240 when the outputs from the comparators are invalid, the latch 290 stores the last valid outputs from the comparators and continues to provide the last valid outputs to the electronic processor 220 (for example, by operating in the second latch state). When the electronic processor 220 sends the interrupt signal to the data transmission driver 210, the electronic processor 220 also sends the interrupt signal to the latch 290. When the latch 290 receives the interrupt signal, the latch 290 switches from operating in the second latch state to operating in the first latch state. Although in FIG. 2, the latch 290 is illustrated as a separate hardware component, in some embodiments, the latch 290 is implemented in software and may be implemented by the electronic processor 220.

In addition, in some embodiments, the first comparator 265, second comparator 270, third comparator 275, fourth comparator 280, and fifth comparator 285 are also implemented by the electronic processor 220. For example, FIG. 2 illustrates a connection from the mode switch 205 to the electronic processor 220 and the connection determining circuit 215. Such a connection indicates a connection between the mode switch 205 and an analog-to-digital converter of the electronic processor 220. In such embodiments, the electronic processor 220 receives the data signal from the multimode pin 240 through the mode switch 205 when the mode switch 205 is in the first state. The electronic processor 220 then, by executing software instructions, determines a corresponding voltage range of the incoming data signal at the multimode pin 240.

As shown in FIG. 2, the electronic processor 220 is coupled to the data transmission driver 210 for exchange of data via a data bus. The electronic processor 220 is also coupled to the connection determining circuit 215 to receive an indication from the connection determining circuit 215 of, as discussed in further detail below, the type of accessory connected to the electronic device 105, and an indication of whether the talk actuator 130, and/or the secondary actuator 135 are activated. Additionally, the electronic processor 220 is coupled to a voltage divider including Rb and Rc. The voltage divider provides a calibration signal to the electronic processor 220 so that the electronic processor 220 is more accurately able to determine which voltage range the incoming signal at the multimode pin 240.

Figure 3A:
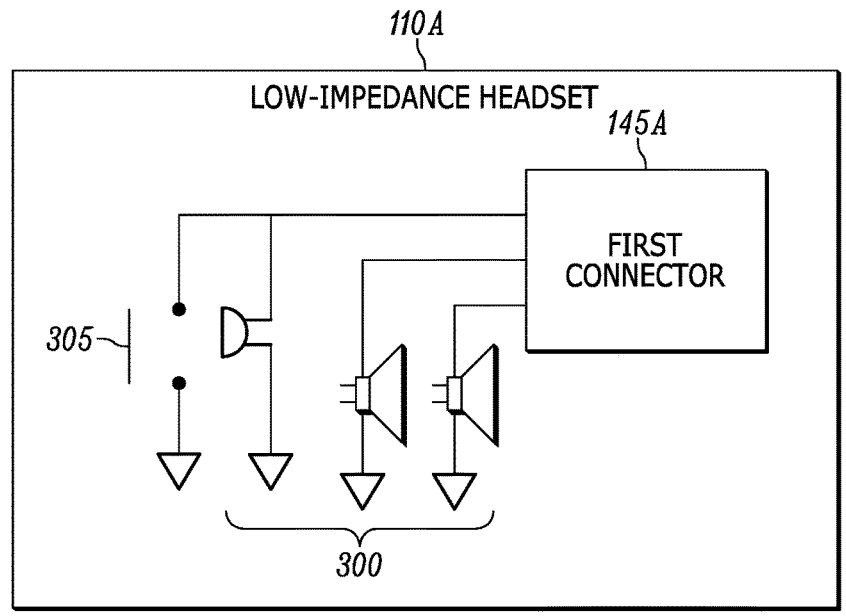
FIGS. 3A through 3C illustrate diagrams of different types of external accessories.
Figure 3B:
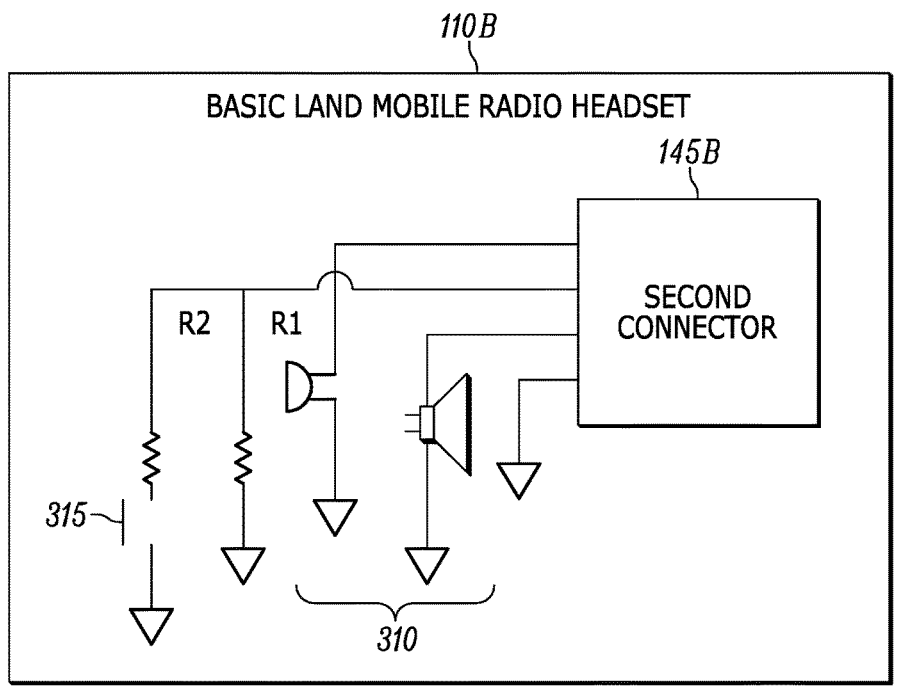
Figure 3C:
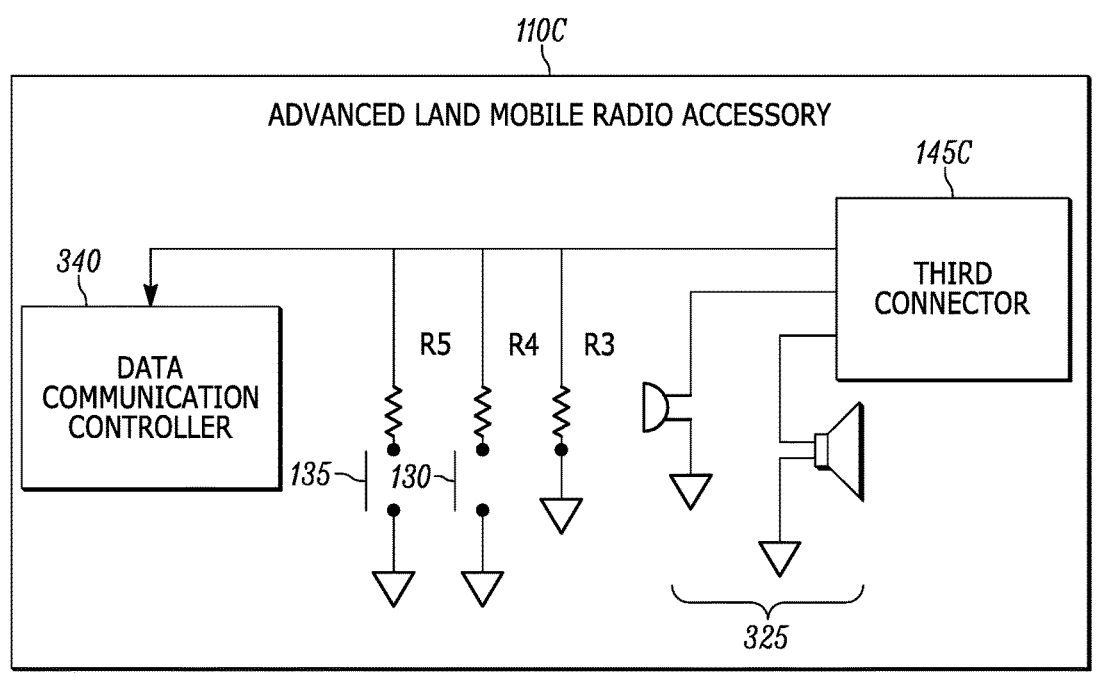

As discussed above, the electronic device 105 connects to different types of external accessories 110. FIGS. 3A through 3C are diagrams of different exemplary types of external accessories 110. FIG. 3A illustrates a first type of external accessory 110a. The first type of external accessory 110a includes a first set of audio components 300 (for example, a microphone and a set of speakers), a talk actuator 305, and a first connector 145a. In the illustrated example, the first type of external accessory 110a includes a low-impedance headset. The first type of external accessory 110a receives and transmits sounds signals through the first set of audio components 300. FIG. 3B illustrates a second type of external accessory 110b. The second type of external accessory 110b includes a second set of audio components 310, a second talk actuator 315, a pull-down resistor R1, and a second connector 145b. In the illustrated embodiment, the second type of external accessory 110b corresponds to a basic land mobile radio headset. The second type of external accessory 110b operates similarly to the first type of external accessory 110a. The second type of external accessory 110b, however, may be manufactured by a different manufacturer. The pull-down resistor R1 is a differentiator between the first type of external accessory 110a and the second type of external accessory 110b. In one example, the pull-down resistor R1 is approximately 11.3 kiloOhms. The presence of the pull-down resistor R1 allows the electronic processor 220 to differentiate between the first type of external accessory 110a and the second type of external accessory 110b. As shown in FIG. 3B, the second talk actuator 315 is coupled to a second resistor R2. In one example, the second resistor R2 is approximately a seven kiloOhm resistor.

FIG. 3C illustrates a third type of external accessory 110c. The external accessory 110 shown in FIG. 1 corresponds to the third type of external accessory 110c, therefore similar numerals are used to describe the components of the third type of external accessory 110c. The third type of external accessory 110c includes a third set of audio components 325 9for example, the microphone 120 and the speaker 125), a third talk actuator 130, a secondary actuator 135, a data communication controller 340, a third connector 145c, a third resistor R3, a fourth resistor R4, and a fifth resistor R5. In some embodiments, however, the third type of external accessory 110c may not include the third resistor R3. The fourth resistor R4 is coupled to the talk actuator 130 and the fifth resistor R5 is coupled to the secondary actuator 135. In one example, the third resistor R3 may be, for example, an 11.3 kiloOhm resistor, the fourth resistor R4 may be a eight point zero six (8.06) kiloOhm resistor, and the fifth resistor R5 may be a 16.2 kiloOhm resistor. The third type of external accessory 110c can exchange sound signals with the electronic device 105, but, unlike the first type of external accessory 110a and the second type of external accessory 110b, the third type of external accessory 110c can also communicate data signals through the data communication controller 340 and can communicate at least an additional signal through the secondary actuator 135. In the illustrated embodiment, the third type of external accessory 110c includes an advanced land mobile radio accessory.

Figure 4:
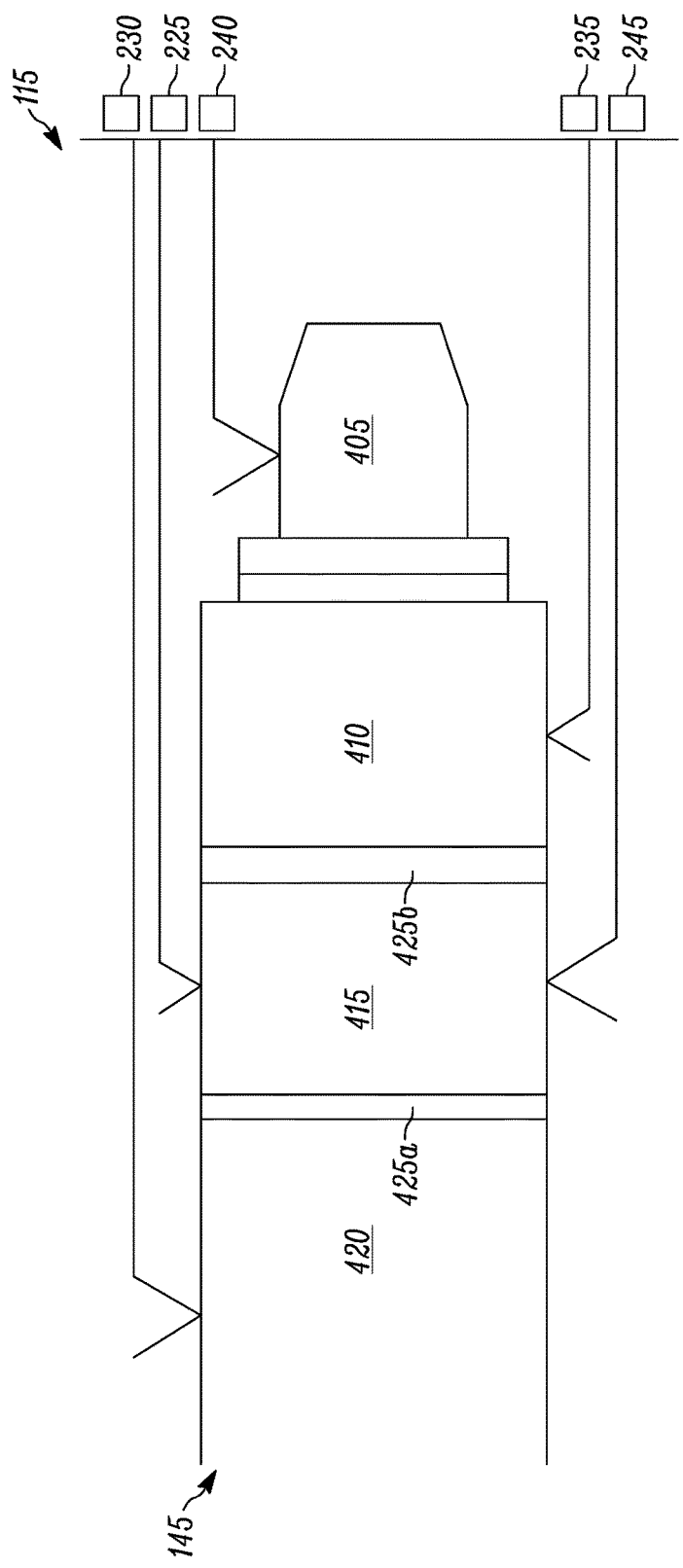
FIG. 4 is an enlarged view of a connector and a connector interface of the communication system of FIG. 1.

Each of the types of external accessories discussed above includes a connector 145 (individually referred to as a first connector 145a, a second connector 145b, and a third connector 145*c*). The connector 145 is compatible with the connector interface 115 of the electronic device 105. In an exemplary embodiment, the connector 145 includes a tip-ring-ring-sleeve (TRRS) connector, as illustrated in FIG. 4. FIG. 4 is a diagram of the connector 145 and the connector interface 115. As shown in FIG. 4, the connector 145 includes a tip pole 405, a first ring pole 410, a second ring pole 415, and a sleeve pole 420. FIG. 3 also illustrates the structure of the connector interface 115, and the coupling of the connector interface 115 with the connector 400. In the illustrated embodiment, the microphone pin 230 couples to the sleeve pole 420 of the connector 400, the detect pin 225 couples to the second ring pole 415, the multimode pin 240 couples to the tip pole 405, the speaker pin 235 couples to the first ring pole 410, and the ground pin 245 coupled to the second ring pole 415. As shown in FIG. 3, when the connector 345 is fully inserted and coupled to the connector interface 115, the detect pin 225 is connected to the ground pin 245. Therefore, when the connector 145 is fully inserted and coupled to the electronic device 105, the detect pin 225 is at a ground voltage. When, however, the connector 400 is moved and/or only partially inserted, the detect pin 225 bounces on a plastic separator 425*a* or 425*b*. In other embodiments, the specific connector 145 used and/or the specific connections between the connector 145 and the connector interface 115 may be different. In other embodiments, the connector 145 may have a different form factor. For example, the connector 145 may be rectangular and more closely resemble a universal serial bus (USB) connector.

Figure 5:
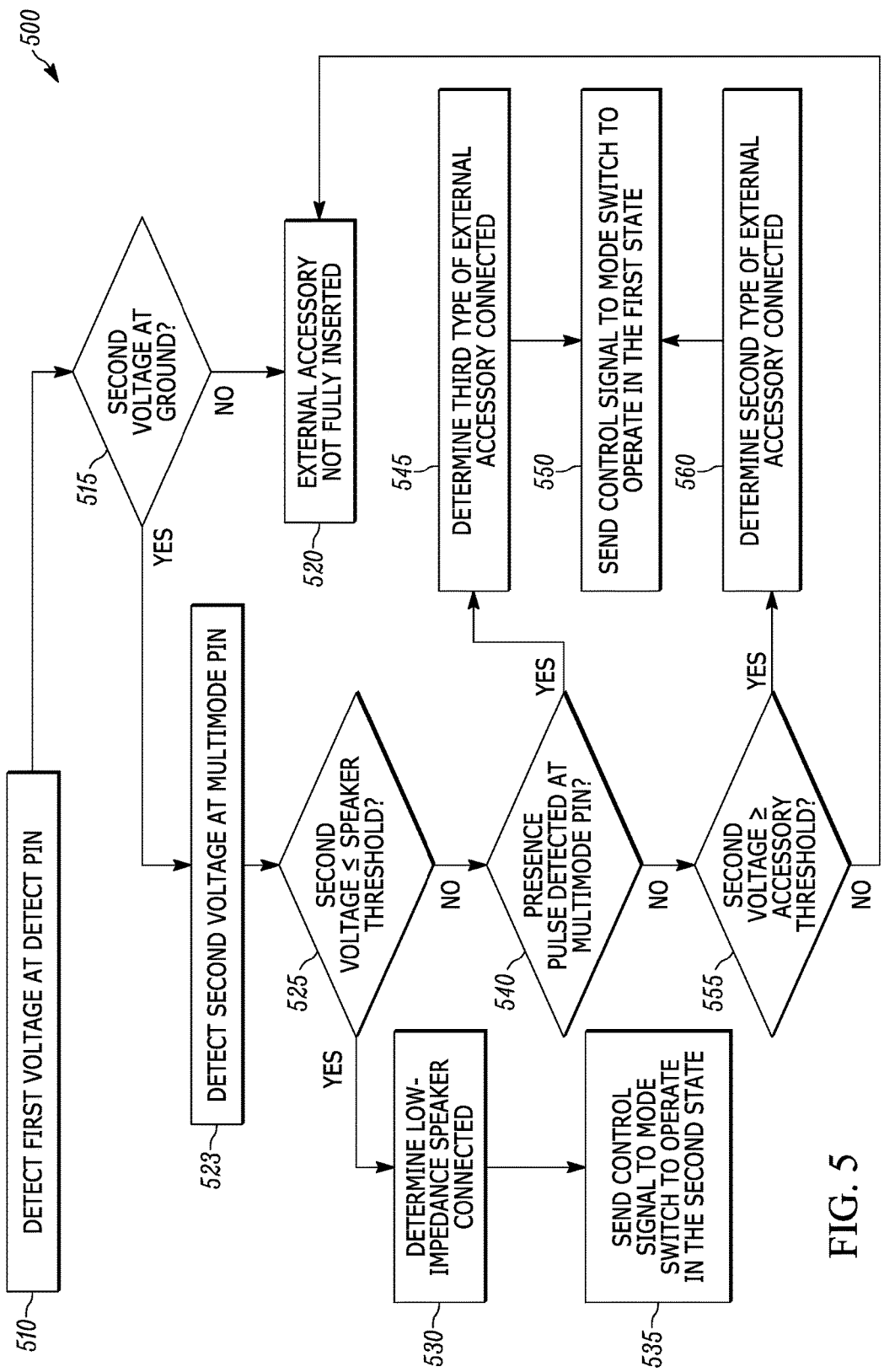
FIG. 5 is a flowchart illustrating a method of detecting an external accessory connected to the electronic device.

FIG. 5 is a flowchart illustrating a method 500 of detecting an external accessory 110 connected to the electronic device 105. When the electronic device 105 is powered on or reset, the electronic device 105 initiates by operating in the first mode (for example, the mode switch 205 is in the first state and thus the multimode pin 240 is coupled to the connection determining circuit 215 and the data transmission driver 210). The electronic processor 220 then determines, based on the voltage at the multimode pin 240, whether the electronic device 105 continues to operate in the first state, or switches to operate in the second state. As shown in FIG. 5, The electronic device 105 detects a first voltage at the detect pin 225 with the electronic processor 220 (block 510). The electronic processor 220 then determines whether the second voltage is approximately equal to the ground voltage (for example, zero volts) at block 515. When the electronic processor 220 determines that the second voltage is not at ground voltage, the electronic processor 220 determines that the external accessory 110 is not fully inserted (block 520). In some embodiments, the electronic device 105 outputs an error message or notification to indicate to the user that the external accessory 110 is not fully inserted. The electronic device 105 ceases communication with the external accessory 110 when the electronic processor 220 determines that the external accessory 110 is not fully inserted.

On the other hand, when the electronic processor 220 determines that the detect pin 225 is at the ground voltage, the electronic processor 220 proceeds to detect whether there is a second voltage at the multimode pin 240 (block 523). When the electronic processor 220 does not detect the second voltage (in other words, the multimode pin 240 is open), the external accessory 110 is not fully inserted as described with respect to block 520. Detection of the second voltage at the multimode pin 240 (for example, indicative of a non-open multimode pin 240) therefore indicates that the external accessory 110 is fully inserted. In other words, when the electronic processor 220 detects the second voltage at the multimode pin 240, the electronic processor 220 determines that the external accessory has been fully inserted.

The electronic processor 220 then proceeds to detect a voltage event at the multimode pin 240 to determine which type of external accessory 110 is connected to the electronic device 105. As described in more detail in blocks 525 through 560, the voltage event may include, for example, a voltage below a speaker threshold, a presence pulse from the data communication controller 340, and/or a voltage above an accessory threshold. Based on which voltage event is detected, the electronic processor 220 determines which external accessory 110 is connected. The electronic processor 220 determines, via the connection determining circuit 215, whether the second voltage is less than or equal to a speaker threshold (block 525). In particular, the electronic processor 220 determines whether the output from the first comparator 265 indicates the second voltage is less than or equal to the speaker threshold (shown in FIG. 2 as V1). Comparing the second voltage to the speaker threshold allows the electronic device 105 to determine whether a low-impedance external accessory 110 is connected to the electronic device 105. In one example, the speaker threshold corresponds to one Volt. When the electronic processor 220 determines that the second voltage is less than or equal to the speaker threshold, the electronic processor 220 determines that a first type of external accessory 110*a* (for example, a low-impedance headset) is connected to the electronic device 105 (block 530). The electronic processor 220, in response to determining that the first type of external accessory 110*a* is connected, sends a control signal to the mode switch 205 to operate in the second state (block 535). The mode switch 205 then begins to operate in the second state thus passing the signals from the multimode pin to the audio control circuit 200.

Referring back to block 525, when the electronic processor 220 determines that the second voltage exceeds (for example, is not greater than or equal to) the speaker threshold, the electronic processor 220 proceeds to determine whether a data presence pulse is received from the external accessory 110 at the multimode pin 240 (block 540). The presence pulse is emitted from the data communication controller 340 of the third type of external accessory 110*c*. The presence pulse includes, for example, a high voltage signal, followed by a low voltage signal, and then another high voltage signal. In other embodiments, the specific presence pulse may be different. When the electronic processor 220 detects a presence pulse from the multimode pin 240, the electronic processor 220 determines that the third type of external accessory 110*c* is connected to the electronic device 105 (block 545). The electronic processor 220, in response to determining that the third type of external accessory 110*c* is connected to the electronic device 105, sends a control signal to the mode switch 205 to continue to operate in the first state (block 550). The mode switch 205 then continues to provide the signals from the multimode pin 240 to the data transmission driver 210 and to the connection determining circuit 215.

On the other hand, when the electronic processor 220 does not detect the presence pulse from the external accessory 110, the electronic processor 220 then determines whether the second voltage exceeds an accessory threshold (block 555). In one example, the accessory threshold is approximately three Volts. In some embodiments, the accessory threshold may be for example three point three (3.3) Volts. In particular, the accessory threshold corresponds to a voltage at the multimode pin 240 when a resistor Ra (shown in FIG. 2) of the electronic device 105 is connected to the pull-down resistor R1 or a parallel combination of pull-down resistor R1 and second resistor R2. When the second voltage exceeds the accessory threshold, the electronic processor 220 determines that the second type of external accessory 110b is connected to the electronic device 105 (block 560). The electronic processor 220 then sends the control signal to the mode switch 205 to operate in the first state as described above with respect to block 550. When the second voltage does not exceed the accessory threshold, the electronic processor 220 determines that the external accessory 110 is not fully inserted (block 520).

Figure 6:
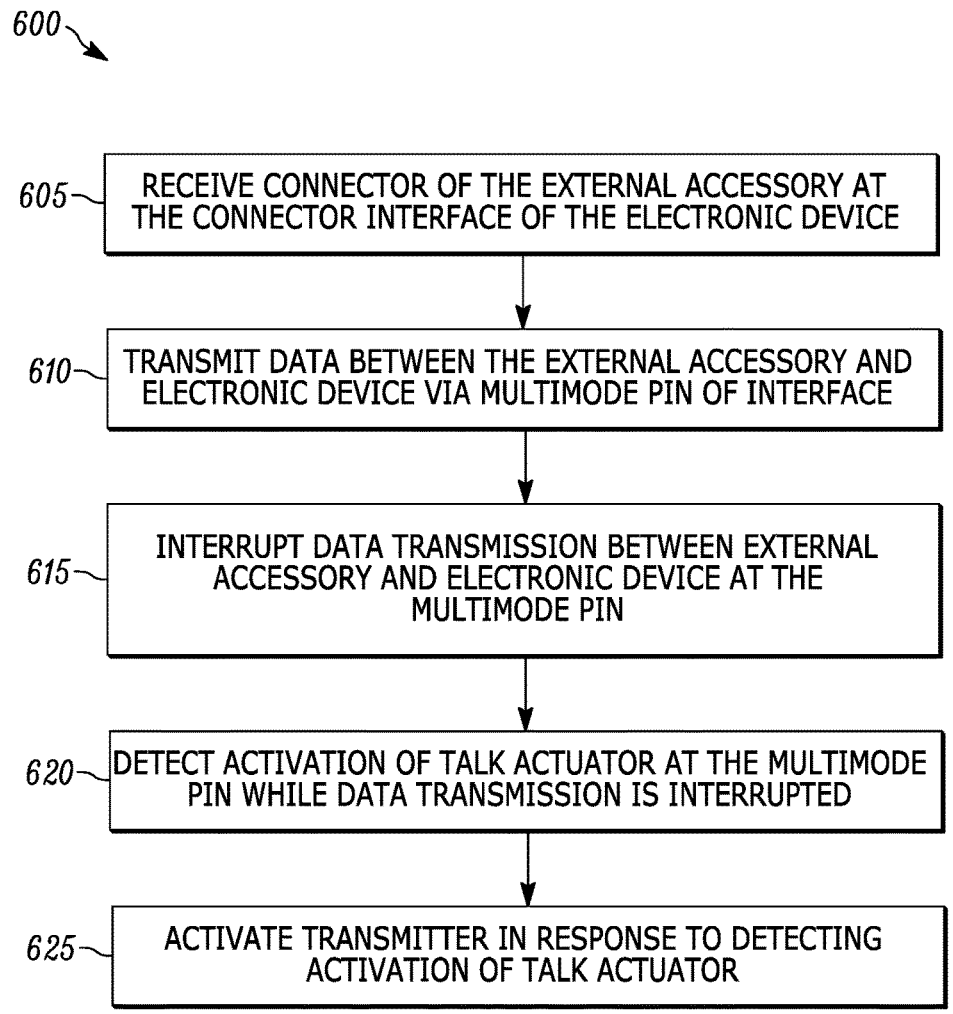
FIG. 6 is a flowchart illustrating a method exchanging data between the electronic device and the external accessory.

When the third type of external accessory 110c is connected to the electronic device 105, the data communication controller 340 can exchange data with the electronic device 105 through the data transmission driver 210. FIG. 6 is a flowchart illustrating a method 600 of exchanging data between the electronic device 105 and the external accessory 110. FIG. 6 refers to a step of receiving the connector 145 of the external accessory 110 at the connector interface 115 of the electronic device 105 described in more detail by FIGS. 4 and 5 (block 605). After the external accessory 110 is connected to the electronic device 105, the data transmission driver 210 transmits data between the external accessory 110 and the electronic device 105 through the multimode pin 240 of the connector interface 115 (block 610). As described above, data communication occurs via voltage signals at the multimode pin 240 exchanged between the data communication controller 340 of the external accessory 110 and the data transmission driver 210 of the electronic device 105. The data transmission driver 210 may store and/or transmit to the electronic processor 220 at least some of the data received from the external accessory 110. In some embodiments, the data transmission driver 210 receives configuration information indicating specific protocols and/or procedures to operate the external accessory 110 properly.

The electronic processor 220 then interrupts data transmission between the external accessory 110 and the electronic device 105 at the multimode pin 240 (block 615). In particular, and as described in more detail in FIG. 7, the electronic processor 220 sends an interrupt signal to the data transmission driver 210. While data transmission is interrupted, the electronic processor 220 detects activation of the talk actuator 130 of the external accessory 110 via the voltage detected at the multimode pin 240 (block 620). The interruption of data transmission over the multimode pin 240 allows the electronic device 105 to detect activation of the talk actuator 130 without a noticeable delay to the user over the same pin or line over which data is exchanged (for example, the multimode pin 240) even while data transmission is in progress. In particular, rather than waiting for the data transmission to be completed before detecting whether the talk actuator 330 is activated (which would cause an unacceptable delay for the user), the electronic processor 220 periodically interrupts the data transmission. During the brief interruption, the electronic processor 220 determines whether the talk actuator 330 has been activated. In response to detecting activation of the talk actuator 130, the electronic processor 220 sends an activation signal to the audio control circuit 200 to activate the transmitter 250 (block 625). In some embodiments, the electronic processor 220 sends the activation signal to the transmitter 250 directly.

Figure 7:
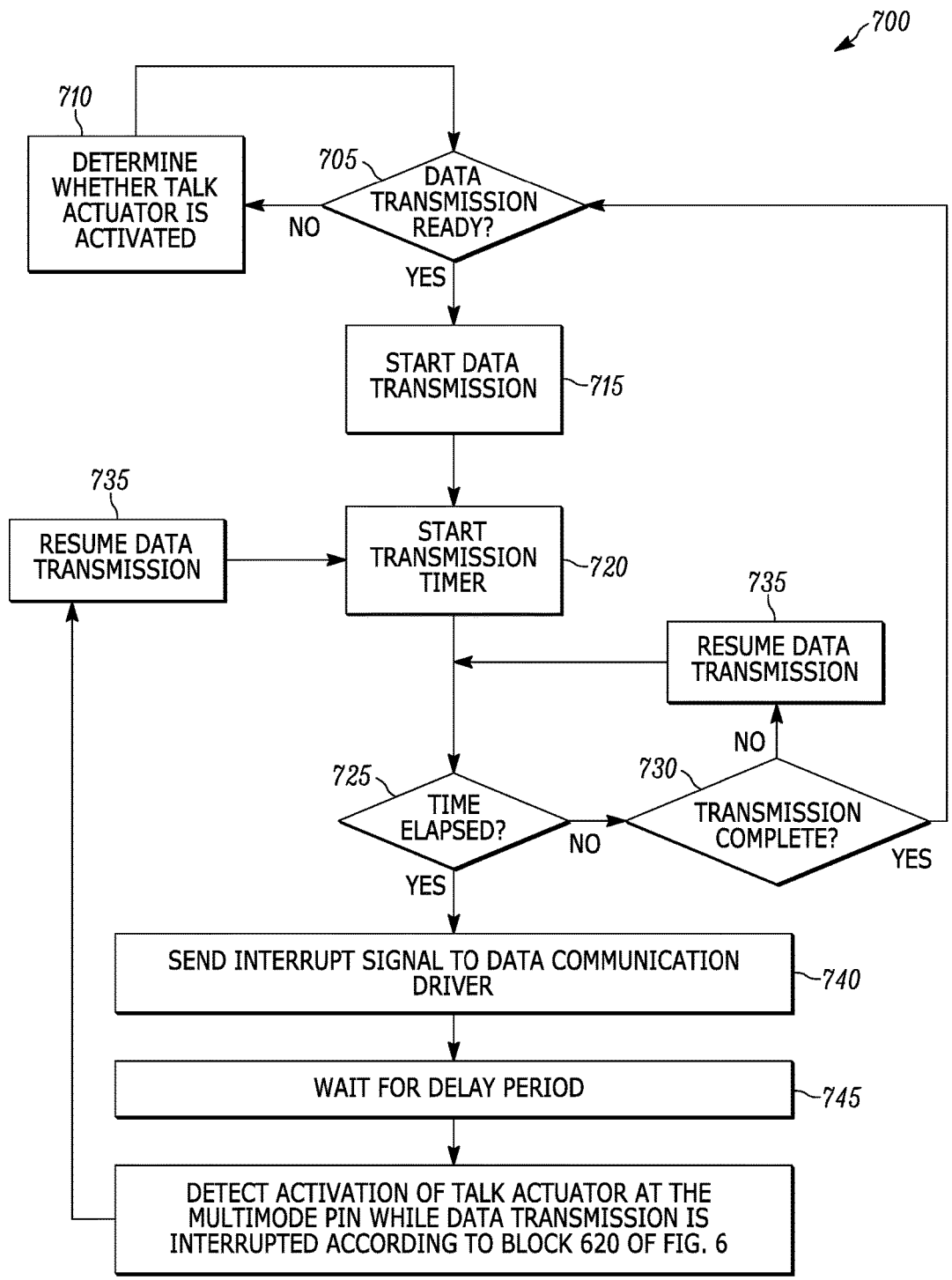
FIG. 7 is a flowchart illustrating a method of transmitting data and interrupting data transmission between the electronic device and the external accessory.

FIG. 7 is a flowchart illustrating a method 700 of transmitting data and periodically interrupting data transmission between the electronic device 105 and the external accessory 110. The electronic processor 220 determines whether a data transmission is ready at the multimode pin 240 (block 705). The electronic processor 220 determines that a data transmission is ready via, for example, the voltage at the multimode pin 240. For example, at the start of a data transmission, the external accessory 110 may send a synchronization signal to the electronic device 105 via the multimode pin 240. The electronic processor 220 may then determine that a data transmission is ready in response to receiving the synchronization signal. When the electronic processor 220 determines that data transmission is not ready, the electronic processor 220 determines whether the talk actuator 130 of the external accessory 110 is activated (block 710), as described in more detail in FIG. 8. After determining whether the talk actuator 130 is actuated (for example, performing the method shown in FIG. 8), the electronic processor 220 returns to block 705 to determine whether a data transmission is ready. On the other hand, when the electronic processor 220 determines that a data transmission is ready at the multimode pin 240, data transmission starts between the electronic device 105 and the external accessory 110 (for example, between the data transmission driver 210 and the data communication controller 340) at block 715. The electronic processor 220 also starts a transmission timer (block 720). In the illustrated embodiment, the electronic processor 220 starts the transmission timer concurrently with starting the data transmission. In one example, the transmission timer has a duration of two and a half (2.5) milliseconds. This exemplary duration reduces a delay in detecting activation of the talk actuator 130 and/or a secondary actuator 135 such that the delay is unnoticeable to the user. In other embodiments, the transmission timer may have a different duration that also reduces the delay in detecting activation of the talk actuator 130 and/or the secondary actuator 135.

The electronic processor 220 monitors the transmission timer and determines whether the transmission timer has elapsed (block 725). When the electronic processor 220 determines that the timer has not yet elapsed, the electronic processor 220 determines whether the transmission is complete (block 730). In some embodiments, the electronic processor 220 determines that the data transmission is complete when an end voltage or indication is transmitted and/or received by the electronic device 105. In other embodiments, the electronic processor 220 determines that the data transmission has completed when the voltage at the multimode pin 240 does not change for a predetermined period of time. When the electronic processor 220 determines that the transmission is complete, the electronic processor 220 returns to block 705 to determine whether another data transmission is ready. When the electronic processor 220 determines that the transmission is not complete, the electronic processor 220 allows the data transmission to continue through the multimode pin 240 (block 735).

Referring back to block 725, when the electronic processor 220 determines that the transmission timer has elapsed, the electronic processor 220 sends an interrupt signal though the inhibit output 260 to the data transmission driver 210 (block 740). The data transmission driver 210 temporarily stops data transmission in response to receiving the interrupt signal from the electronic processor 220. As discussed above the electronic processor 220 also sends the interrupt signal to the latch 290 to indicate to the latch 290 to operate in the first latch state. The latch 290 then operates in the first latch state while data transmission is interrupted. After the data transmission is interrupted, the electronic processor 220 waits for a delay period (block 745). The delay period allows the voltage at the multimode pin 240 to settle at the voltage value corresponding to the state of the talk actuator 130 and/or the secondary actuator 135. In particular, because the multimode pin 240 is used to transfer data via different voltage signals, the multimode pin 240 may need to wait for the delay period before a valid signal regarding the activation of the talk actuator 330 and/or the secondary actuator 335 may be detected at the multimode pin 240. After the delay period has passed, the electronic processor 220 may detect the activation of the talk actuator 130 as described above with respect to block 620 of FIG. 6 and described in more detail in FIG. 8. After detecting the activation of the talk actuator 130 and/or the secondary actuator 135, the data transmission driver 210 resumes data transmission (block 750) and restarts the transmission timer (block 720).

Figure 8:
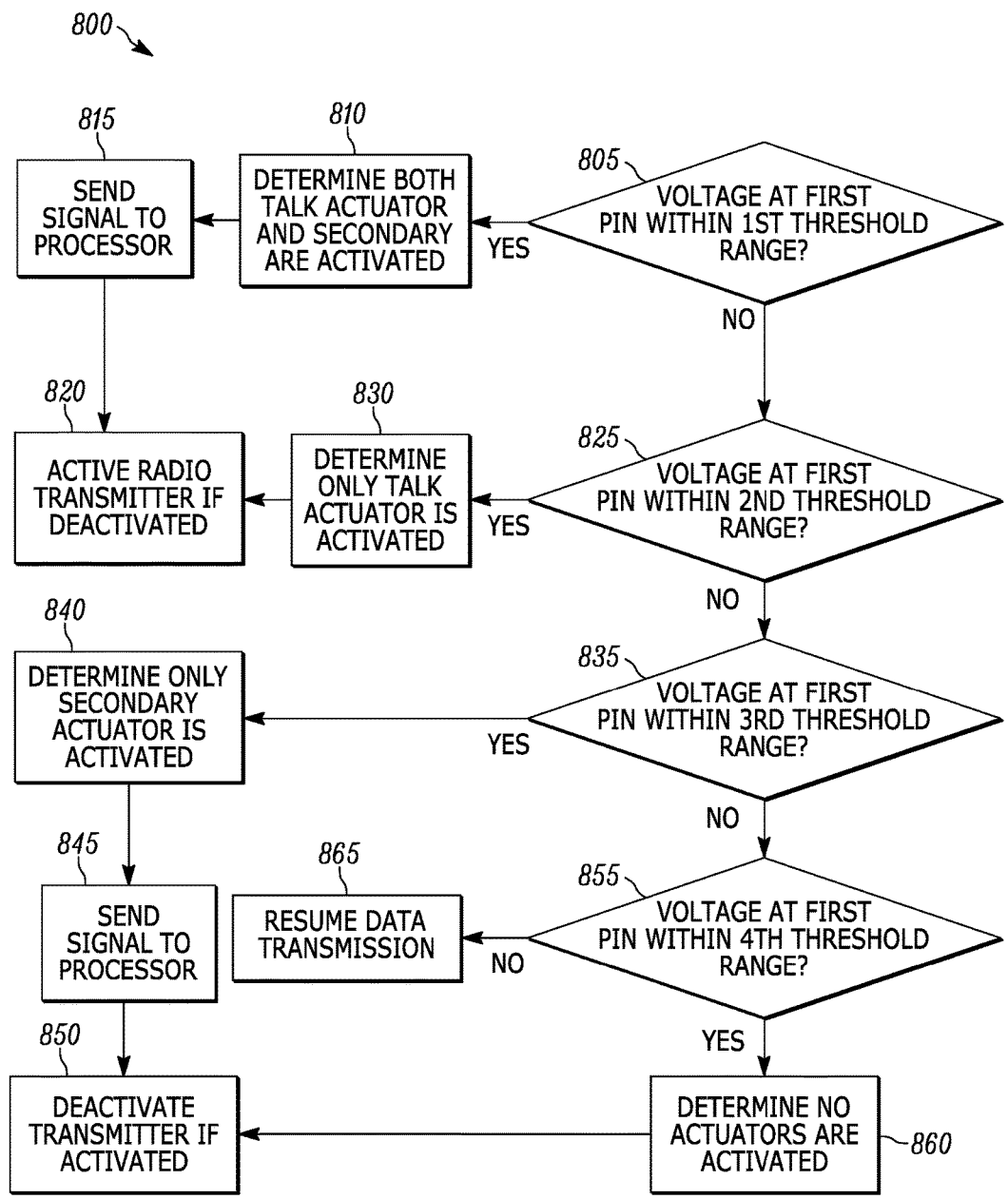
FIG. 8 is a flowchart illustrating a method of detecting an activation of the talk actuator of the external accessory.

FIG. 8 is a flowchart illustrating a method 800 of detecting an activation of the talk actuator 130. In particular, the method 800 includes detecting an activation of the talk actuator 130 and/or of the secondary actuator 135. As discussed above, the method 800 of detecting activation of the talk actuator 130 occurs while data transmission over the multimode pin 240 is interrupted. Otherwise, the voltage signals at the multimode pin 240 are not indicative of the actuation of the talk actuator 130, but rather encode data signals directed to the data transmission driver 210. As shown in FIG. 8, the electronic processor 220 determines whether the voltage at the multimode pin 240 is within a first threshold range (block 805). In one example, the first threshold range corresponds to approximately between three (3) and three and two tenth (3.2) Volts. In this example, the electronic processor 220 determines that the voltage at the multimode pin 240 is within the first threshold range when the second comparator 270 indicates the voltage is greater than three (3) Volts, but the third comparator 275 indicates the voltage is less than three point three (3.3) Volts.

When the electronic processor 220 determines that the voltage at the multimode pin 240 is within the first threshold range, the electronic processor 220 determines that both the talk actuator 130 and the secondary actuator 135 are activated (block 810). Because the talk actuator 130 and the secondary actuator 135 are activated, a parallel combination of R3, R4, and R5 are connected in series with the resistor Ra of the electronic device 105, which causes the voltage at the multimode pin 240 to be between three (3) Volts and three point two (3.2) Volts. In response, the electronic processor 220 processes the activation of the secondary actuator 135 (block 815) and activates the transmitter 250 when the transmitter 250 has been deactivated (block 820). In some embodiments, the electronic processor 220 does not activate the transmitter 250 directly, but rather sends a control signal to the audio control circuit 200 to activate the transmitter 250. The electronic processor 220 may be programmed to initiate a particular action upon activation of the secondary actuator 335. In one example, when the secondary actuator 335 includes an emergency button, the electronic processor 220 may be configured to generate an auditory or visual alarm. In other examples, however, the electronic processor 220 may instead, generate a specific message for transmission to a remote device with the transmitter 250.

Referring back to block 805, when the electronic processor 220 determines that the voltage at the multimode pin 240 is not within the first threshold range, the electronic processor 220 determines whether the voltage at the multimode pin 240 is within the second threshold range (block 825). In one example, the second threshold range corresponds to approximately between three point three (3.3) Volts and three point five (3.5) Volts. In this example, the electronic processor 220 determines that the voltage at the multimode pin 240 is within the second threshold range when the third comparator 275 indicates that the voltage is greater than three point three (3.3) Volts, but the fourth comparator 280 indicates that the voltage is less than three point six (3.6) Volts. When the electronic processor 220 determines that the voltage at the multimode pin 240 is within the second threshold range, the electronic processor 220 determines that only the talk actuator 130 is activated (for example, the secondary actuator 335 is not actuated) at block 830. Because only the talk actuator is activated, a parallel combination of R3 and R4 is connected in series with the resistor Ra of the electronic device 105. The parallel combination of R3 and R4 causes the voltage at the multimode pin 240 to be between three point three (3.3) and three point five (3.5) Volts. In response the electronic processor 220 activates the transmitter 250 as discussed above with respect to block 820.

Referring back to block 825, when the electronic processor 220 determines that the voltage at the multimode pin 240 is not within the second threshold range, the electronic processor 220 proceeds to determine whether the voltage at the multimode pin 240 is within a third threshold range (block 835). In one example, the third threshold range corresponds to approximately between three point six (3.6) and three point eight (3.8) Volts. In this example, the electronic processor 220 determines that the voltage at the multimode pin 240 is within the third threshold range when the fourth comparator 280 indicates that the voltage is greater than three point six (3.6) Volts, but the fifth comparator 285 indicates that the voltage is less than four point one (4.1) Volts.

When the electronic processor 220 determines that the voltage at the multimode pin 240 is within the third threshold range, the electronic processor 220 determines that only the secondary actuator 135 is activated (for example, the talk actuator 130 is not activated) at block 840. Because only the secondary actuator 135 is activated, a parallel combination of R3 and R5 is connected in series with the resistor Ra of the electronic device 105. The parallel combination of R3 and R5 causes the voltage at the multimode pin 240 to be between three point six (3.6) and three point eight (3.8) Volts. In response, the electronic processor 220 processes the activation of the secondary actuator 135 (block 845) and deactivates the transmitter 250 when it has been activated (block 850). As discussed above with respect to block 815, based on the particular secondary actuator 135, the electronic processor 220 may perform different actions upon activation of the secondary actuator 135. As also discussed above, in some embodiments, the electronic processor 220 does not deactivate the transmitter 250 directly, but rather sends a signal to the audio control circuit 200 to deactivate the transmitter 250.

Referring back to block 835, when the electronic processor 220 determines that the voltage at the multimode pin 240 is not within the third threshold range, the electronic processor 220 proceeds to determine whether the voltage at the multimode pin 240 is within a fourth threshold range (block 855). In one example, the fourth threshold range corresponds to approximately between four point one (4.1) and four point three (4.3) Volts. In this example, the electronic processor 220 determines that the voltage at the multimode pin 240 is within the fourth threshold range when the fifth comparator 285 indicates that the voltage is greater than four point one (4.1) Volts. When the electronic processor 220 determines that the voltage at the multimode pin 240 is within the fourth threshold range, the electronic processor 220 determines that no actuators are activated, for example, the talk actuator 130 and the secondary actuator 135 are deactivated (block 860). Because the talk actuator 130 and the secondary actuator 135 are not activated, only R3 is connected in series with the resistor Ra of the electronic device 105. The resistor R3 causes the voltage at the multimode pin 240 to be between four point one (4.1) and four point three (4.3) Volts. In response, the electronic processor 220 deactivates the transmitter 250 when it has been activated, as discussed above with respect to block 850.

On the other hand, when the electronic processor 220 determines that the voltage at the multimode pin 240 is not within the fourth threshold range, the electronic processor 220 resumes data transmission through the multimode pin 240 as described above with respect to FIG. 7. Additionally, when the method 800 was performed by the electronic processor 220 during interruption of the data transmission, the electronic processor 220 sends a signal to the data transmission driver 210 to resume data transmission through the multimode pin 240 after the transmitter 250 is activated or deactivated. With reference to blocks 820 and 850, after the electronic processor 220 activates or deactivates the transmitter, respectively, the electronic processor 220 continues to periodically check whether a data transmission is ready as discussed with respect to block 705 of FIG. 7, or resumes data transmission as discussed with respect to block 735 of FIG. 7.

In the embodiment described with respect to FIG. 8, the electronic processor 220 determines whether the talk actuator 330 and/or the secondary actuator 335 are activated. In some embodiments, for example, when the external accessory 110 does not include a secondary actuator 335, the electronic processor 220 only determines whether the talk actuator 330 is activated. In such embodiments, the electronic processor 220 may not need to determine whether the voltage at the multimode pin 240 is within the first threshold range, the second threshold range, the third threshold range, and the fourth threshold range. Rather, in such embodiments, the electronic processor 220 may determine whether the voltage at the multimode pin exceeds a talk actuator threshold. When the voltage at the multimode pin exceeds the talk actuator threshold, the electronic processor 220 determines that the talk actuator 130 is activated.

The first threshold range, the second threshold range, the third threshold range, and the fourth threshold range vary in different implementations of the communication system 100. The particular voltage thresholds vary on, for example, the resistors that are coupled to the talk actuator 130 and/or the secondary actuators 135 in each of the external accessories 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of exchanging data between an electronic device and an external accessory, the method comprising:
   receiving, at an interface of the electronic device, a connector of the external accessory;
   transmitting, via a first pin of the interface, data between the external accessory and the electronic device;
   interrupting, via a signal from an electronic processor of the electronic device, data transmission between the external accessory and the electronic device via the first pin of the interface;
   while data transmission is interrupted, detecting, via the first pin of the interface, an activation of a talk actuator; and
   activating, via the electronic processor, a transmitter in response to detecting the activation of the talk actuator.

2. The method of claim 1, further comprising:
   detecting, via the electronic processor, a first voltage at the first pin of the interface, and
   determining, via the electronic processor, that the external accessory is fully inserted when the first voltage is detected.

3. The method of claim 1, further comprising:
   detecting, via the electronic processor, a voltage event via the first pin of the interface; and
   determining, via the electronic processor, a type of external accessory connected to the electronic device based on the first voltage.

4. The method of claim 1, wherein interrupting data transmission includes periodically interrupting data transmission between the external accessory and the electronic device.

5. The method of claim 1, wherein interrupting data transmission includes determining, with the electronic processor, whether a transmission timer has elapsed; and suspending, with the electronic processor, data transmission when the transmission timer has elapsed.

6. The method of claim 1, wherein detecting activation of the talk actuator includes
   determining, with the electronic processor, whether a delay has elapsed;
   detecting, via the first pin of the interface, a first voltage when the delay had elapsed;
   determining, with the electronic processor, that the first voltage is within a first threshold range; and
   detecting activation of the talk actuator when the first voltage is within the first threshold range.

7. The method of claim 6, further comprising:
   determining, with the electronic processor, that the first voltage is within a second threshold range; and
   detecting activation of a secondary actuator when the first voltage is within the second threshold range.

8. The method of claim 7, further comprising:
   determining, with the electronic processor, that the first voltage is within a third threshold range; and
   detecting activation of the talk actuator and the secondary actuator when the first voltage is within the third threshold range.

9. The method of claim 1, further comprising resuming, via the first pin of the interface, data transmission after the transmitter is activated.

10. The method of claim 1, further comprising:
    detecting, via the first pin of the interface, a first voltage upon receiving the connector of the external accessory;
    determining, with the electronic processor, whether the first voltage exceeds an accessory threshold;
    operating, via a mode switch of the electronic device, in a first mode when the first voltage exceeds the accessory threshold; and
    operating, via the mode switch, in a second mode when the first voltage does not exceed the accessory threshold.

11. The method of claim 1, wherein receiving the connector of the external accessory includes receiving a tip-ring-ring-sleeve connector.

12. An electronic device comprising:
    an interface configured to receive a connector from an external accessory, the interface including a first pin coupled to the connector;
    a transmitter configured to transmit messages with an external device; and
    an electronic processor coupled to the interface and the transmitter, the electronic processor configured to
    transmit, via the first pin of the interface, data between the external accessory and the electronic device,
    interrupt data transmission between the external accessory and the electronic device through the first pin of the interface,
    detect, while data transmission is interrupted, activation of a talk actuator via the first pin of the interface, and
    send an activation signal to the transmitter in response to detecting activation of the talk actuator.

13. The electronic device of claim 12, wherein the electronic processor is further configured to
    detect a first voltage at the first pin of the interface, and
    determine that the external accessory is fully inserted when the first voltage is detected.

14. The electronic device of claim 12, wherein the electronic processor is further configured to
    detect a voltage event via the first pin of the interface, and
    determine a type of external accessory connected to the electronic device based on the voltage event.

15. The electronic device of claim 12, wherein the electronic processor is configured to interrupt data transmission periodically.

16. The electronic device of claim 12, wherein the electronic processor interrupts data transmission by:
    determining whether a transmission timer has elapsed, and
    suspending data transmission when the transmission timer has elapsed.

17. The electronic device of claim 12, wherein the electronic processor is further configured to
    determine whether a delay has elapsed,
    detect a first voltage via the first pin of the interface when the delay has elapsed,
    determine whether the first voltage is within a first threshold range, and
    detect activation of the talk actuator when the first voltage is within the first threshold range.

18. The electronic device of claim 17, wherein the electronic processor is further configured to determine whether the first voltage is within a second threshold range, and detect activation of a secondary actuator when the first voltage is within the second threshold range.

19. The electronic device of claim 18, wherein the electronic processor is further configured to
determine whether the first voltage is within a third threshold range, and
detect activation of the talk actuator and the secondary actuator when the first voltage is within the third threshold range.

20. The electronic device of claim 12, wherein the electronic processor is further configured to resume data transmission via the first pin of the interface after the transmitter is activated.

21. The electronic device of claim 12, further comprising a mode switch configured to switch between a first state and a second state, and wherein the electronic processor is further configured to
detect via the first pin of the interface a first voltage upon receiving the connector of the external accessory,
determine whether the first voltage exceeds an accessory threshold, operating the mode switch in the first state when the first voltage exceeds the accessory threshold, and
operate the mode switch in the second state when the first voltage does not exceed the accessory threshold.

22. The electronic device of claim 12, wherein the interface is configured to receive a tip-ring-ring-sleeve connector from the external device.

* * * * *